United States Patent [19]
Huang

[11] Patent Number: 5,390,577
[45] Date of Patent: Feb. 21, 1995

[54] SAWING MACHINE

[76] Inventor: Chin-Chung Huang, No. 4, Alley 51, Lane 424, Kuo-Tzu-Keng Rd., Tai-Ping Hsiang, Taichung Hsien, Taiwan, Prov. of China

[21] Appl. No.: 175,277

[22] Filed: Dec. 29, 1993

[51] Int. Cl.[6] .................. B27B 19/06; B27B 19/10
[52] U.S. Cl. .................... 83/784; 83/782; 83/628
[58] Field of Search ............. 83/782, 783, 784, 785, 83/786, 748, 662, 615, 628

[56] References Cited

U.S. PATENT DOCUMENTS

| | | | |
|---|---|---|---|
| 2,868,248 | 1/1959 | Pedersen | 83/748 |
| 4,503,742 | 3/1985 | Sutton | 83/782 |
| 5,058,476 | 10/1991 | Legler et al. | 83/782 |
| 5,065,652 | 11/1991 | Legler et al. | 83/783 |
| 5,228,376 | 7/1993 | Huang | 83/786 |

Primary Examiner—Richard K. Seidel
Assistant Examiner—Charles Goodman
Attorney, Agent, or Firm—Christie, Parker & Hale

[57] ABSTRACT

A sawing machine includes a base body which has a front portion, a rear portion and a worktable with a working surface, and a support body disposed adjacent to the rear portion. The worktable has a sawing slot that opens at the working surface. An upper hollow arm is fixed to the support body and is located above the working surface. A lower hollow arm is fixed to the support body and is located opposite to the upper hollow arm below the working surface. An upper shaft is mounted rotatably in the upper hollow arm, while a lower shaft is mounted rotatably in the lower hollow arm. A driving mechanism is mounted to the support body to drive the shafts to rotate synchronously. Two saw blade mounting members are mounted slidably and respectively to the hollow arms and define cooperatively a straight line passing through the sawing slot. The sawing machine has a converting unit for converting the synchronous rotations of the shafts into synchronous linear movements of the saw-blade mounting members. An elongated saw blade extends along the straight line and has two ends connected to the saw-blade mounting members.

8 Claims, 16 Drawing Sheets

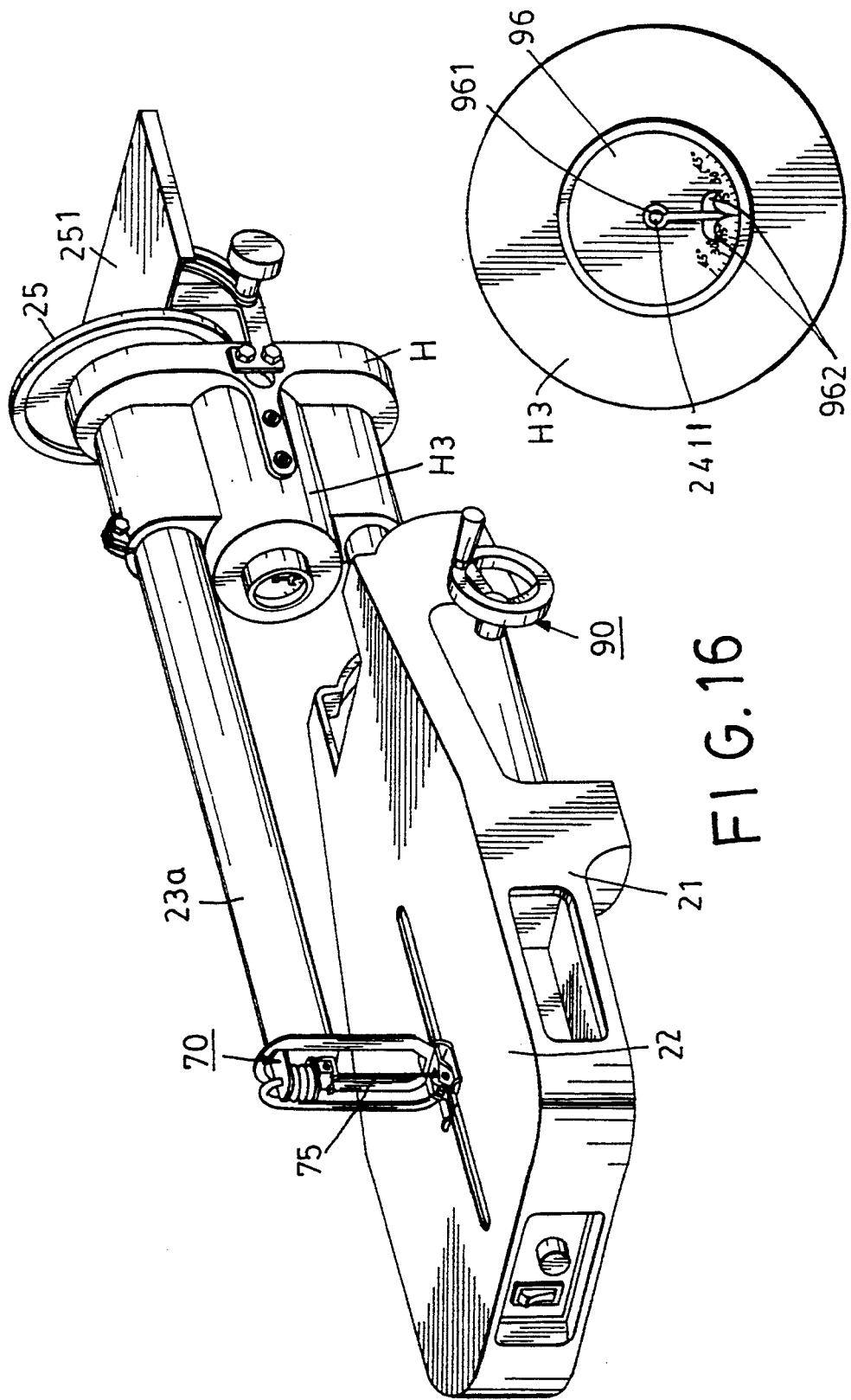

SAWING MACHINE

FIELD OF THE INVENTION

This invention relates to a sawing machine, more particularly to an improved sawing machine which is provided with an elongated saw blade that can reciprocate upwards and downwards along a straight line without any lateral displacement.

DESCRIPTION OF RELATED ART

Referring to FIGS. 1 and 2, a conventional sawing machine 10 has a base body 11 that has a rear portion, a front portion and a worktable. The worktable has a top working surface 12 which extends horizontally and on which a workpiece (not shown) can be supported. The worktable has a sawing slot which is formed therethrough near the front portion of the base body 11 and which opens at the working surface 12. A support body 14 is mounted to the rear portion of the base body 11. An upper hollow arm (13a) is located above the worktable 12. The upper hollow arm (13a) has a rear end that is fixed to the support body 14 and a front end that extends toward the front portion of the base body 11. A driving mechanism 142 is mounted to the support body 14. An upper lever 151 is mounted movably in the upper hollow arm (13a). The upper lever 151 has a rear end driven movably by the driving mechanism 142, a front end extending toward the front end of the upper hollow arm (13a), and an intermediate portion (131a) pivoted to the upper hollow arm (13a). A lower lever 152 is mounted in the base body 11 opposite to the upper lever 151. The lower lever 152 has a rear end driven movably by the driving mechanism 142, a front end extending forwardly, and an intermediate portion (131b) pivoted to the base body 11. An elongated saw blade 16 passes through the sawing slot of the worktable 12 and has two ends which are mounted respectively to the front ends of the upper and lower levers 151, 152.

In order to cut a workpiece on the worktable, the upper and lower levers 151, 152 move reciprocatingly and synchronously about their pivoted intermediate portions (131a, 131b) so as to move the elongated saw blade 16 up and down when the rear ends of the upper and lower levers 151, 152 are driven by the driving mechanism 142. Referring to FIG. 3, a problem occurs in such a reciprocating system. The elongated saw blade 16 is susceptible of lateral displacement, typically 0.8–1.0 mm, due to the fact that the upper and lower levers 151, 152 are long and the distance between the elongated saw blade 16 and the pivoted intermediate portions (131a, 131b) is somewhat long. The undesirable lateral displacement of the elongated saw blade 16 increases the friction between the elongated saw blade 16 and the workpiece as well as the stress on the elongated saw blade 16, thereby causing the elongated saw blade 16 to deform or twist.

Another problem inherent in the reciprocating upper and lower levers 151, 152 stems from the fact that the upper and lower levers 151, 152 move the elongated saw blade 16 along a slightly curved path rather than in a straight line. The elongated saw blade 16, which reciprocates along a curved path, more or less produces a pulling action on the workpiece, thereby increasing the load of the driving mechanism 142 as well as the power consumption.

Referring to FIG. 4, the conventional sawing machine 10 includes an adjustment rod 17 which is provided at the front portion of the base body 11 below the working surface 12 of the worktable in order to incline the worktable to a suitable angle, thereby adjusting the inclined position of the working surface 12 such that a beveled cut can be made on the workpiece.

Instead of the workpiece, the worktable is moved and inclined in the conventional sawing machine 10. This creates a disadvantage in that the workpiece tends to slide downward due to gravity. Thus, the workpiece has to be held in a proper position by the operator, thereby causing difficulties and inconveniences during operation and even adverse effects on the accuracy of the cutting lines or surfaces.

SUMMARY OF THE INVENTION

Therefore, the objective of this invention is provide an improved sawing machine which has an elongated saw blade that can reciprocate upwards and downwards along a straight line without any lateral displacement.

Another objective of this invention is to provide an improved sawing machine which has an elongated saw blade that can be adjusted so as to be disposed in an inclined position with respect to a working surface of a worktable of the improved sawing machine.

Accordingly, a sawing machine of this invention includes a base body which has a rear portion, a front portion and a worktable with a top working surface that extends horizontally from the front portion toward the rear portion. The worktable has a sawing slot which is formed therethrough near the front portion and which opens at the working surface. A support body is located adjacent to the rear portion of the base body. An upper hollow arm has a rear end that is fixed rigidly to the support body and a front end that extends toward the front portion of the base body above the working surface of the worktable. A lower hollow arm is mounted to the base body below the working surface and is located opposite to the upper hollow arm. The lower hollow arm has a rear end that is fixed rigidly to the support body and a front end that extends toward the front portion of the base body. An upper shaft is mounted rotatably in the upper hollow arm and has a rear end and a front end. A lower shaft is mounted rotatably in the lower hollow arm and has a rear end and a front end. A driving mechanism is mounted to the support body and is connected to the rear end of each of the upper and lower shafts in order to drive the upper and lower shafts to rotate synchronously. An upper saw-blade mounting member is disposed above the working surface of the worktable and is mounted slidably to the front end of the upper hollow arm. A lower saw-blade mounting member is disposed below the working surface and is mounted slidably to the front end of the lower hollow arm. The upper and lower saw-blade mounting members define cooperatively a straight line which passes through the sawing slot of the worktable. The sawing machine has means for converting the synchronous rotations of the upper and lower shafts into synchronously and reciprocatingly linear movements of the upper and lower saw-blade mounting members along the straight line when the upper and lower shafts are driven to rotate synchronously. The converting means has an upper converting mechanism for converting the rotation of the upper shaft into the reciprocatingly linear movement of the upper saw-blade mounting member and a lower converting mechanism for converting the rotation of the lower shaft into the reciprocatingly linear movement of the lower saw-blade mounting member. An elongated saw blade extends along the straight line and passes through the sawing slot of the worktable. The elongated saw blade has two ends connected respectively to the upper and lower saw-blade mounting members. The elongated saw blade can move reciprocatingly along the straight line when the upper and lower shafts are driven to rotate synchronously so as to move reciprocatingly and synchronously the upper and lower saw-blade mounting members along the straight line.

Each of the upper and lower converting mechanisms may include an eccentric member which is fixed to and rotatable with the front end of a respective one of the upper and lower shafts, and a first slidable member which is pivoted to the eccentric member and which is engaged slidably with a respective one of the upper and lower saw-blade mounting members.

Each of the upper and lower converting mechanisms may include a positioning member which has a retaining plate that is fixed to the front end of a respective one of the upper and lower hollow arms. The retaining plate is formed with an elongated guiding slot which extends in a first direction parallel to the straight line. Each of the upper and lower saw-blade mounting members includes a second slidable member which has a front protrusion that engages slidably the elongated guiding slot and a rear recess that extends in a second direction perpendicular to the straight line. The first slidable member is engaged slidably within the rear recess and has a hole. The eccentric member has an annular wheel which is fixed to the front end of the respective one of the upper and lower shafts and an eccentric pin which projects from the annular wheel to engage rotatably the hole of the first slidable member. Each of the upper and lower saw-blade mounting members further includes a saw-blade mounting seat which is secured to the front protrusion of the second slidable member of a respective one of the upper and lower sawblade mounting members via the elongated guiding slot of the retaining plate. Each end of the elongated saw blade is attached to the saw-blade mounting seat of a respective one of the upper and lower saw-blade mounting members. When the upper and lower shafts are driven to rotate synchronously, the second slidable members of the upper and lower saw-blade mounting members are actuated to reciprocate synchronously in the first direction while the first slidable members of the upper and lower converting mechanisms are actuated to reciprocate synchronously in the second direction so as to move reciprocatingly the elongated saw blade along the straight line.

The positioning member of the upper converting mechanism may have a plate that projects from the retaining plate thereof. The sawing machine may further have a bellows which has an upper end attached to the plate and a lower end attached to the saw-blade mounting seat. The bellows is associated with a tube which extends downwardly from the upper end of the bellows toward the sawing slot of the worktable.

The sawing machine of this invention further includes means for moving the lower hollow arm along an arcuate path for moving simultaneously the upper hollow arm in order to adjust an inclined position of the straight line, which is defined by the upper and lower saw-blade mounting members and which passes through the sawing slot, relative to the working surface of the worktable so as to dispose the elongated saw blade in the inclined position.

The moving means may include a stationary bracket unit which is fixed to the base body under the working surface of the worktable and which is formed with an arcuate guiding portion to define the arcuate path, and a holding unit which holds rigidly the lower hollow arm. The holding unit is mounted slidably to the stationary bracket unit and is slidable along the arcuate guiding portion.

The holding unit may have an elongated slot. The moving means further includes an adjustment threaded rod which is mounted rotatably to the stationary bracket unit, and a nut member which is sleeved around and engages movably the adjustment threaded rod. The nut member has a protrusion which is engaged slidably within the elongated slot in the holding unit. When the adjustment threaded rod is actuated to rotate, the holding unit and the lower hollow arm are driven to slide along the arcuate guiding portion.

The moving means may further include a rotary handle which is mounted to the base body and connected to one end of the adjustment threaded rod.

BRIEF DESCRIPTION OF THE DRAWINGS

Other features and advantages of the present invention will become apparent in the following detailed description of the preferred embodiments, with reference to the accompanying drawings, in which:

FIG. 16 is a perspective view of the sawing machine which is mounted with the moving means of the second preferred embodiment.

FIG. 17 is a schematic view of a graduated panel of the second preferred embodiment of the moving means shown in FIG. 15.

DETAILED DESCRIPTION OF THE PREFERRED EMBODIMENTS

Figure 1:
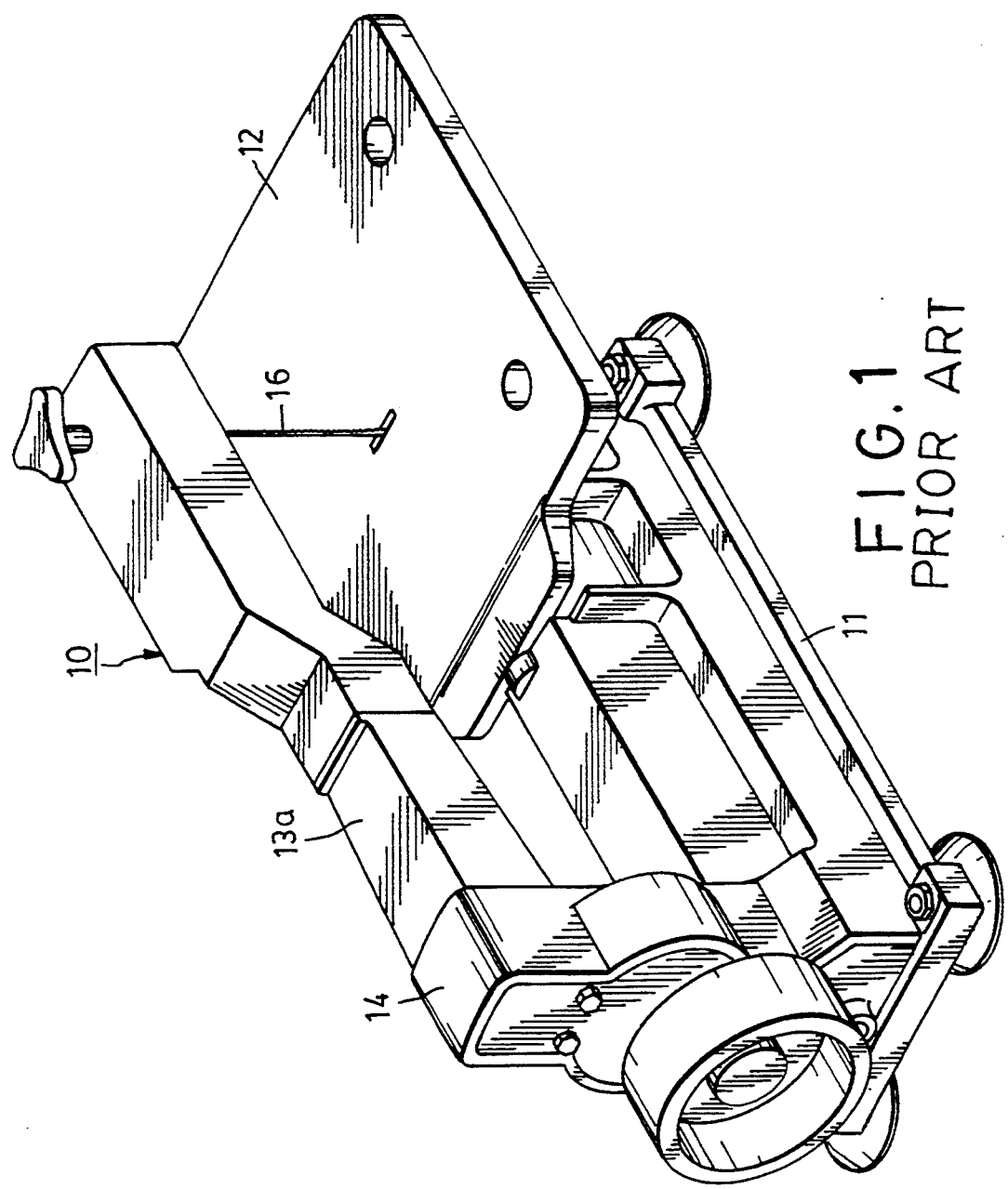
FIG. 1 is a perspective view of a conventional sawing machine.
Figure 2:
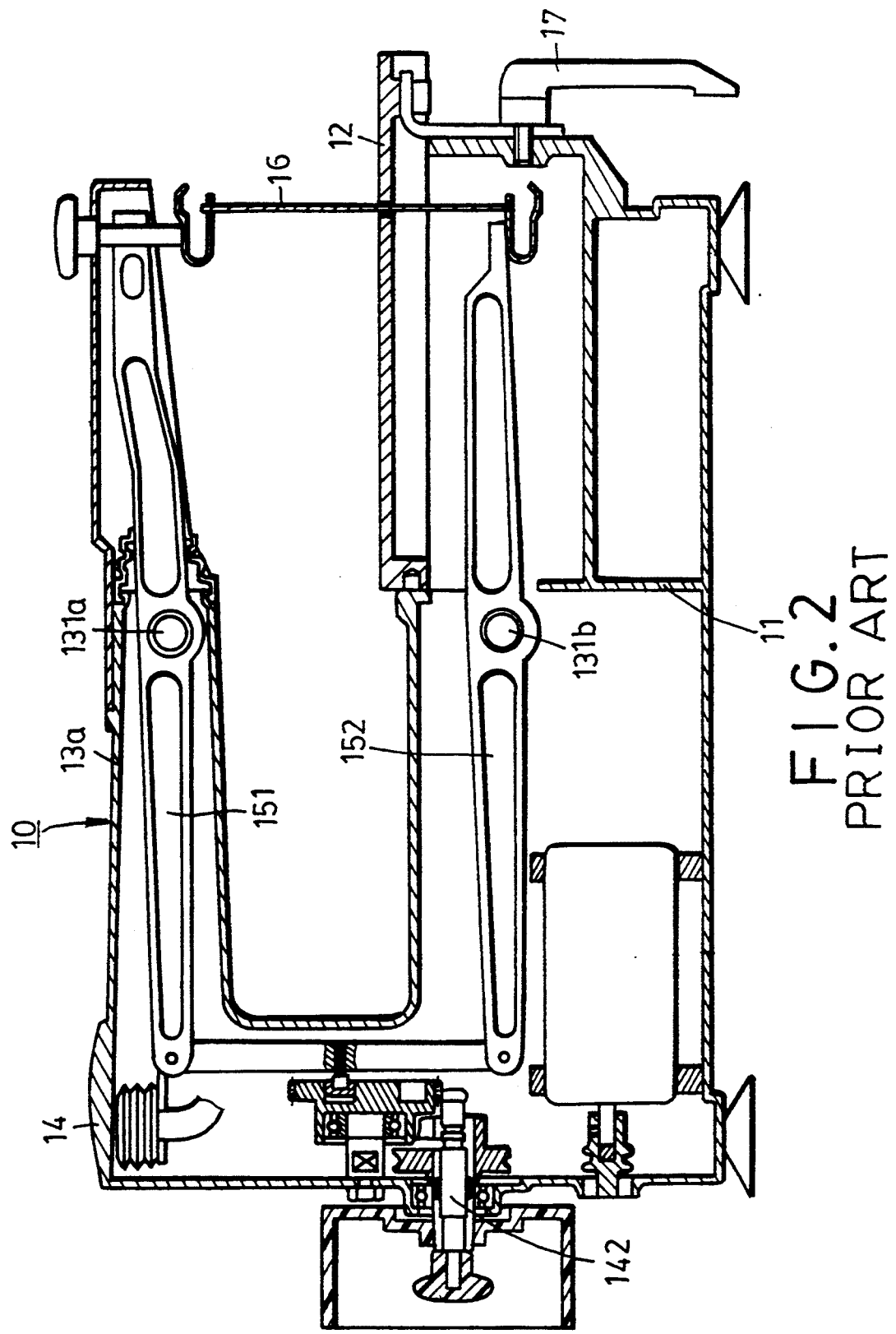
FIG. 2 is a sectional view of the conventional sawing machine.
Figure 3:
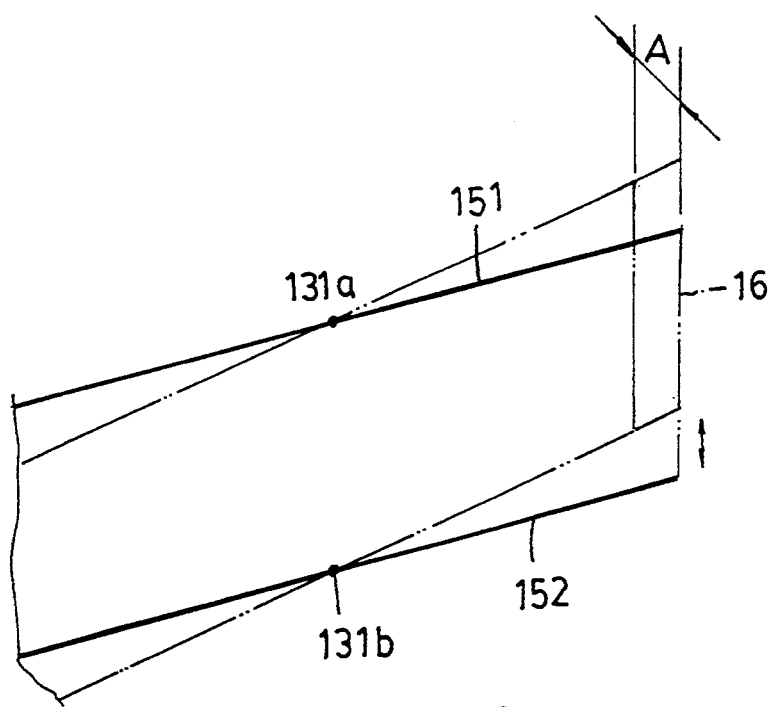
FIG. 3 shows a lateral displacement of an elongated saw blade of the conventional sawing machine.
Figure 4:
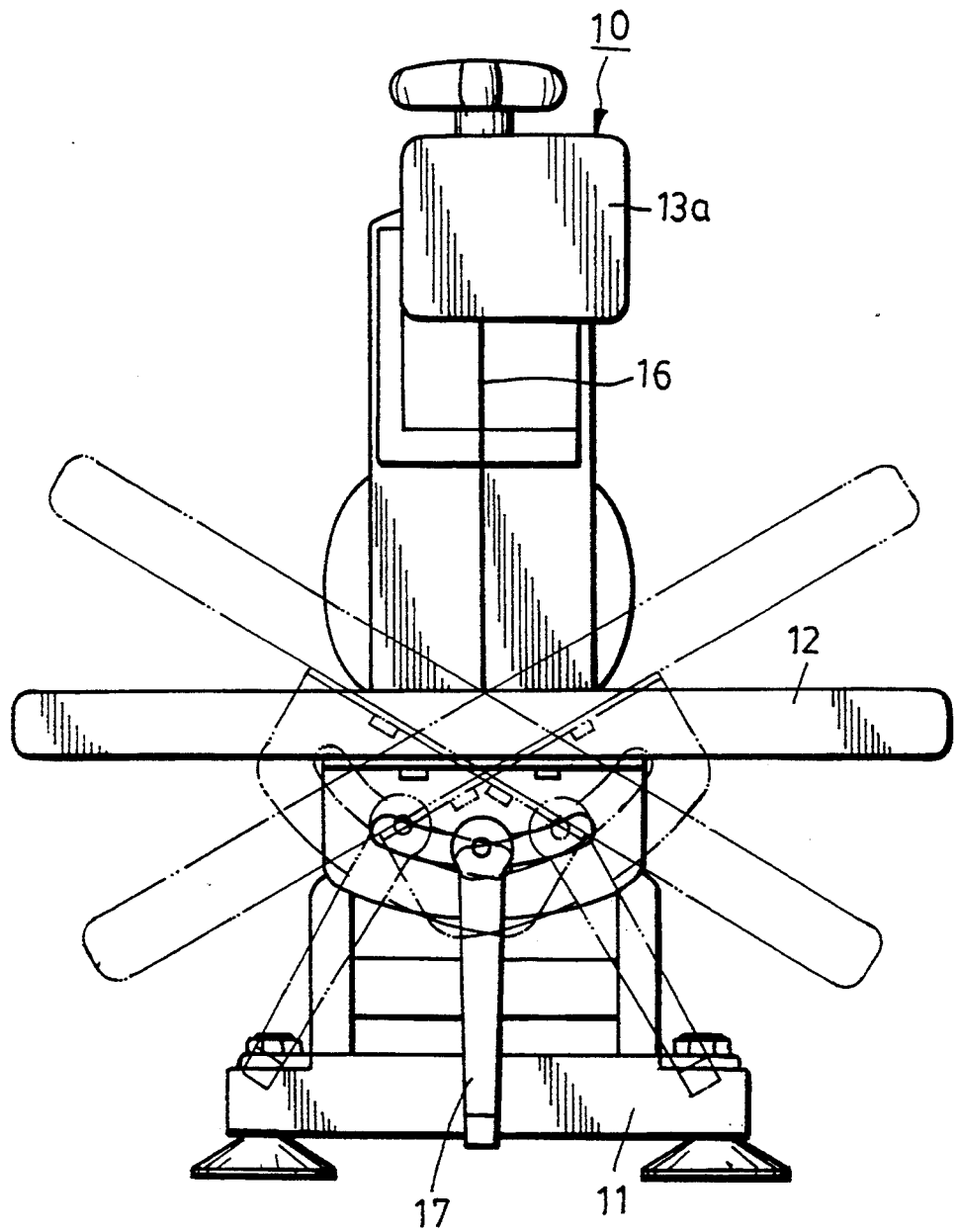
FIG. 4 is a schematic view showing a worktable of the conventional sawing machines when moved to an inclined position.

In the detailed description of the preferred embodiments it should be noted that like elements are indicated by the same reference numerals throughout the disclosure.

Figure 5:
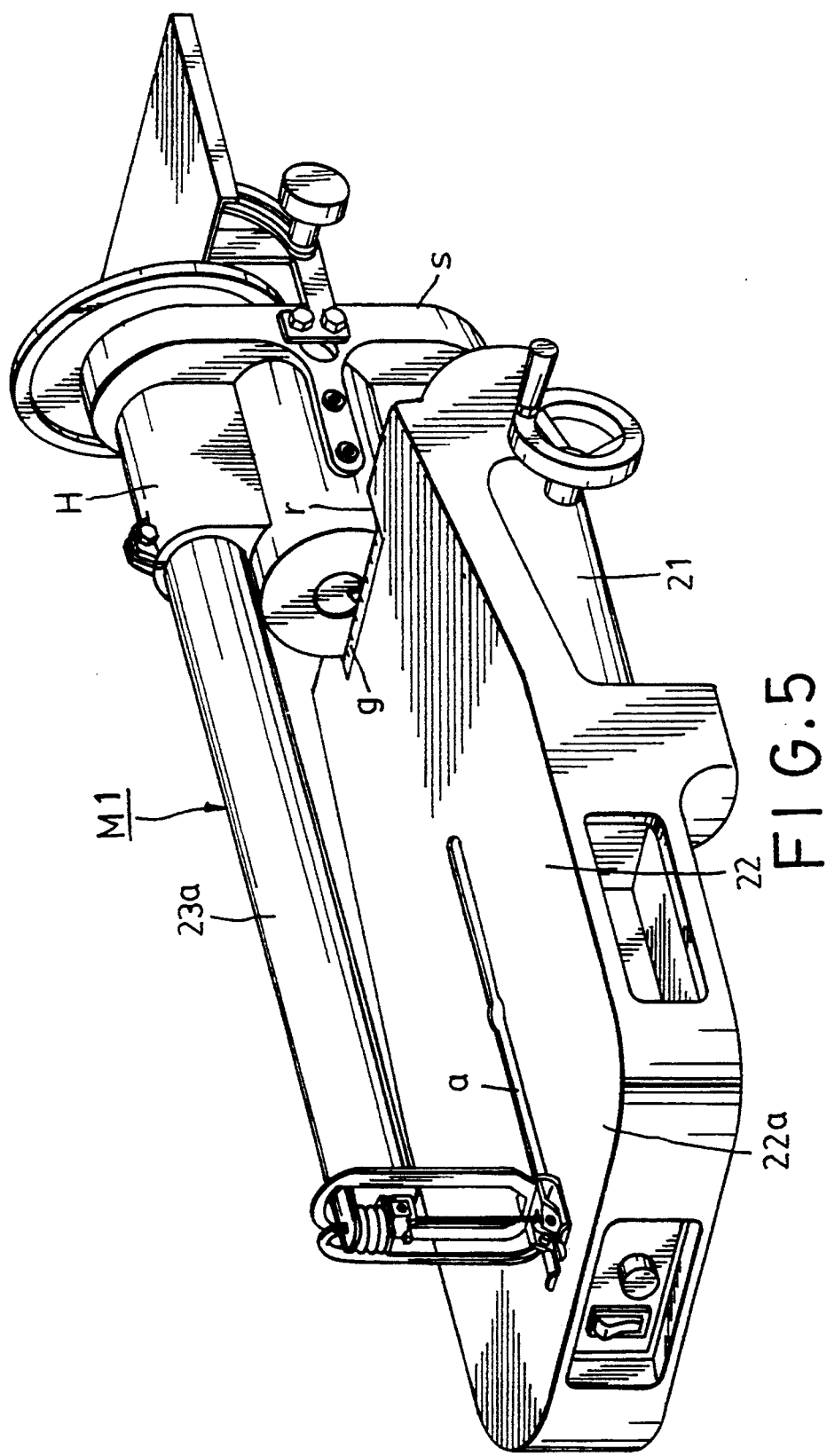
FIG. 5 is a perspective view of a sawing machine of this invention.
Figure 6:
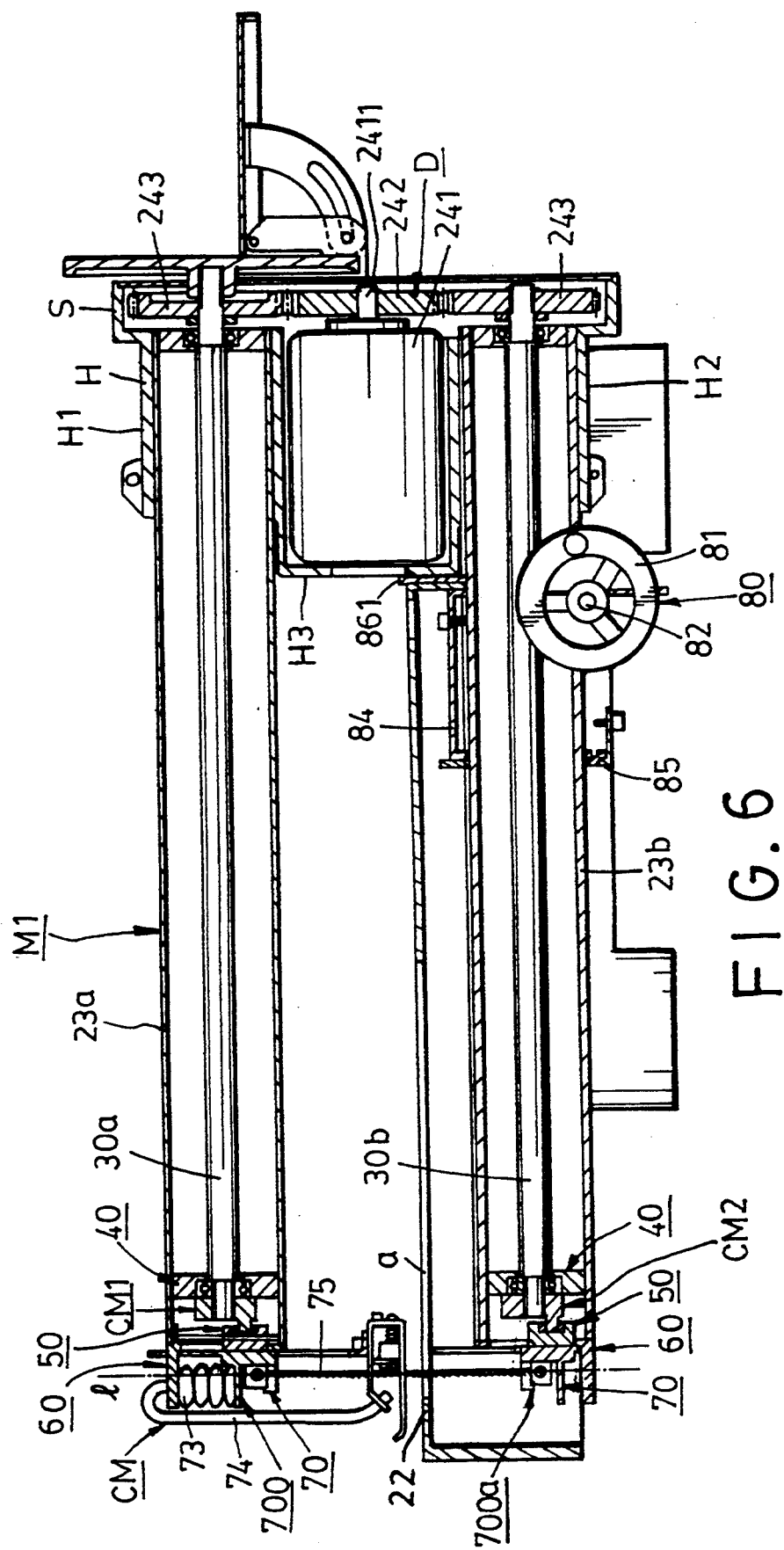
FIG. 6 is a sectional view of the sawing machine of this invention.

Referring to FIGS. 5 and 6, a sawing machine (M1) of this invention includes a base body 21 which has a rear portion, a front portion and a worktable (22a). The worktable (22a) has a top working surface 22 which extends from the front portion toward the rear portion and on which a workpiece (not shown) that is to be cut can be supported. The worktable (22a) further has a sawing slot (a) which is formed therethrough near the front portion and which opens at the working surface 22. The rear portion is formed with a recess (r). A support body (S) is located adjacent to the rear portion of the base body 21. The support body (S) has a housing (H) which includes an upper portion (H1) that is located above the working surface 22, a lower portion (H2) that is located below the working surface 22, and an intermediate portion (H3) that is located between the upper portion (H1) and the lower portion (H2) and that is disposed adjacent to the recess (r).

An upper hollow arm (23a) has a rear end that is fixed rigidly to the upper portion (H1) of the housing (H) and a front end that extends toward the front portion of the base body 21 above the working surface 22. A lower hollow arm (23b) is located opposite to the upper hollow arm (23a) and has a rear end that is fixed rigidly to the lower portion (H2) of the housing (H) and a front end that extends toward the front portion of the base body (21) below the working surface 22. A driving mechanism (D) is mounted in the housing (H) of the support body (S). The driving mechanism (D) has a motor 241 that is mounted in the intermediate portion (H3) and that is associated with a driving shaft 2411, a driving gear 242 that is mounted in the intermediate portion (H3) and that is connected to the driving shaft 2411, an upper driven gear 243 that is mounted in the upper portion (H1) and that meshes with the driving gear 242, and a lower driven gear 243 that is mounted in the lower portion (H2) and that meshes with the driving gear 242. The driving shaft 2411 is parallel substantially to the working surface 22.

An upper shaft (30a) is mounted rotatably in the upper hollow arm (23a). The upper shaft (30a) has a rear end that is connected to and driven rotatably by the upper driven gear 243 and a front end that extends toward the front end of the upper hollow arm (23a). A lower shaft (30b) is mounted rotatably in the lower hollow arm (23b). The lower shaft (30b) has a rear end that is connected to and driven rotatably by the lower driven gear 243 and a front end that extends toward the front end of the lower hollow arm (23b). It is noted that the driving mechanism (D) is operated to drive the upper and lower shafts (23a, 23b) to rotate synchronously.

Figure 7:
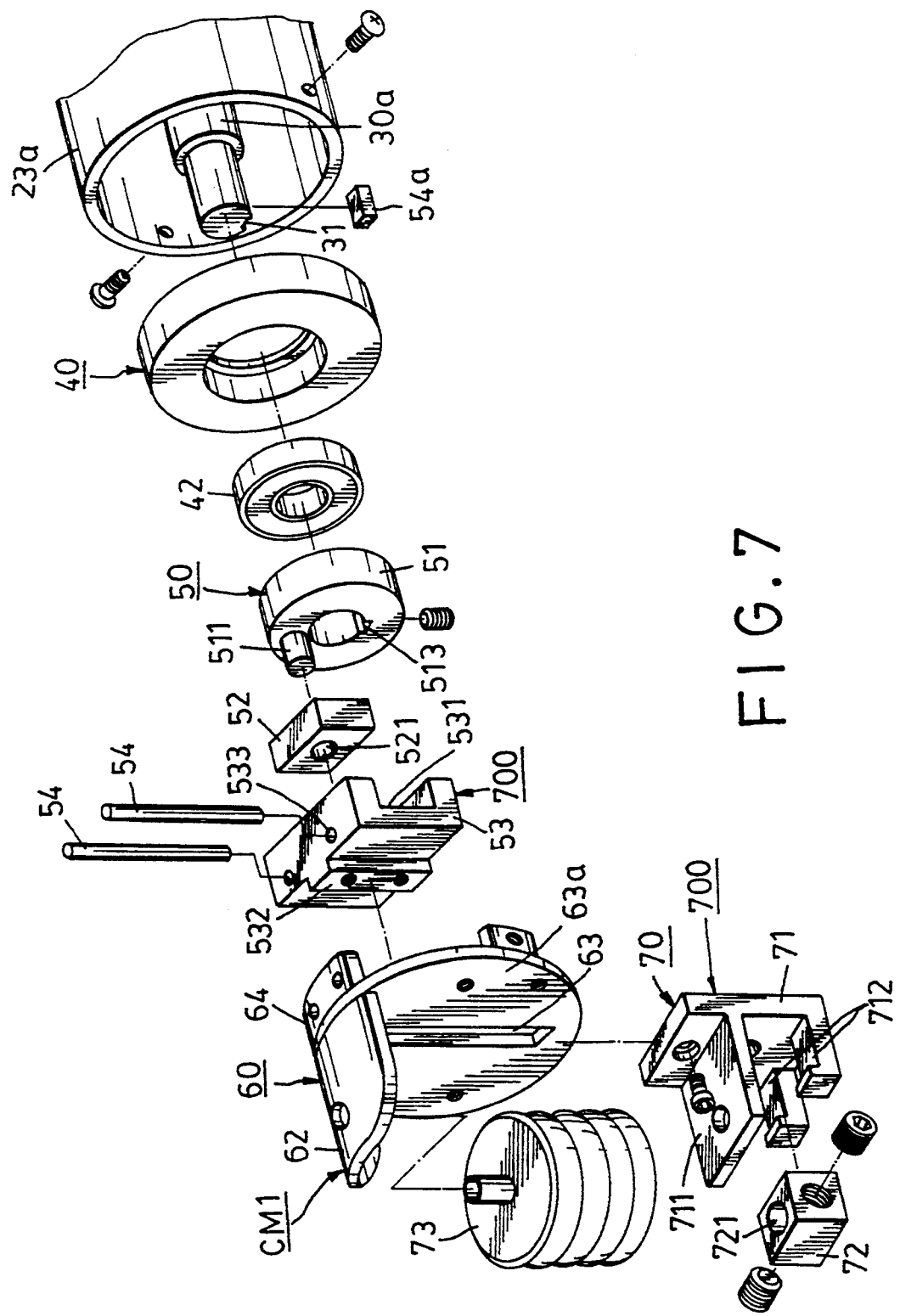
FIG. 7 is an exploded view of an upper converting mechanism of this invention for converting a rotation of an upper shaft into reciprocating linear movement.
Figure 8:
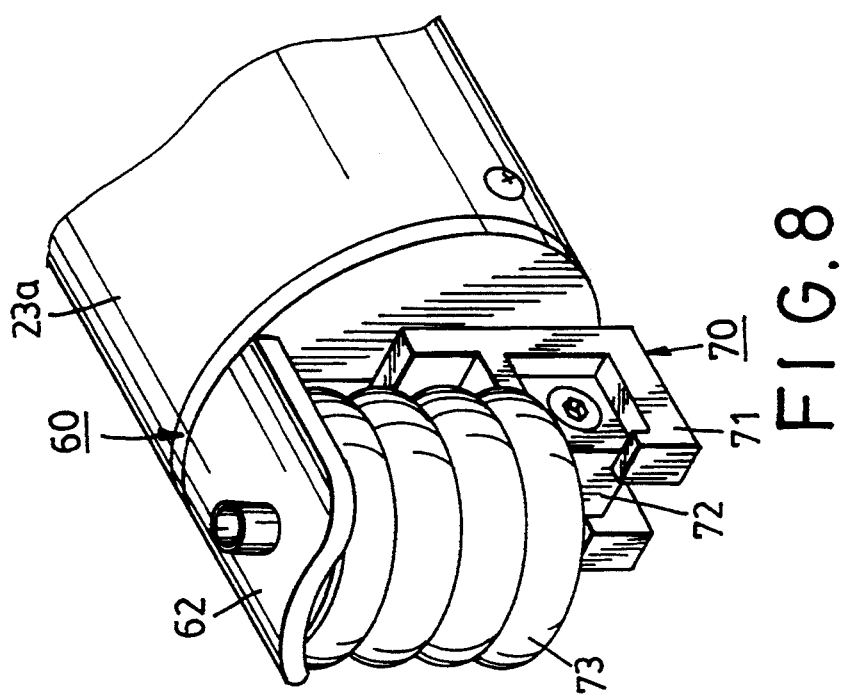
FIG. 8 is a perspective view showing a bellows and a saw-blade mounting seat mounted to an upper hollow arm.
Figure 9:
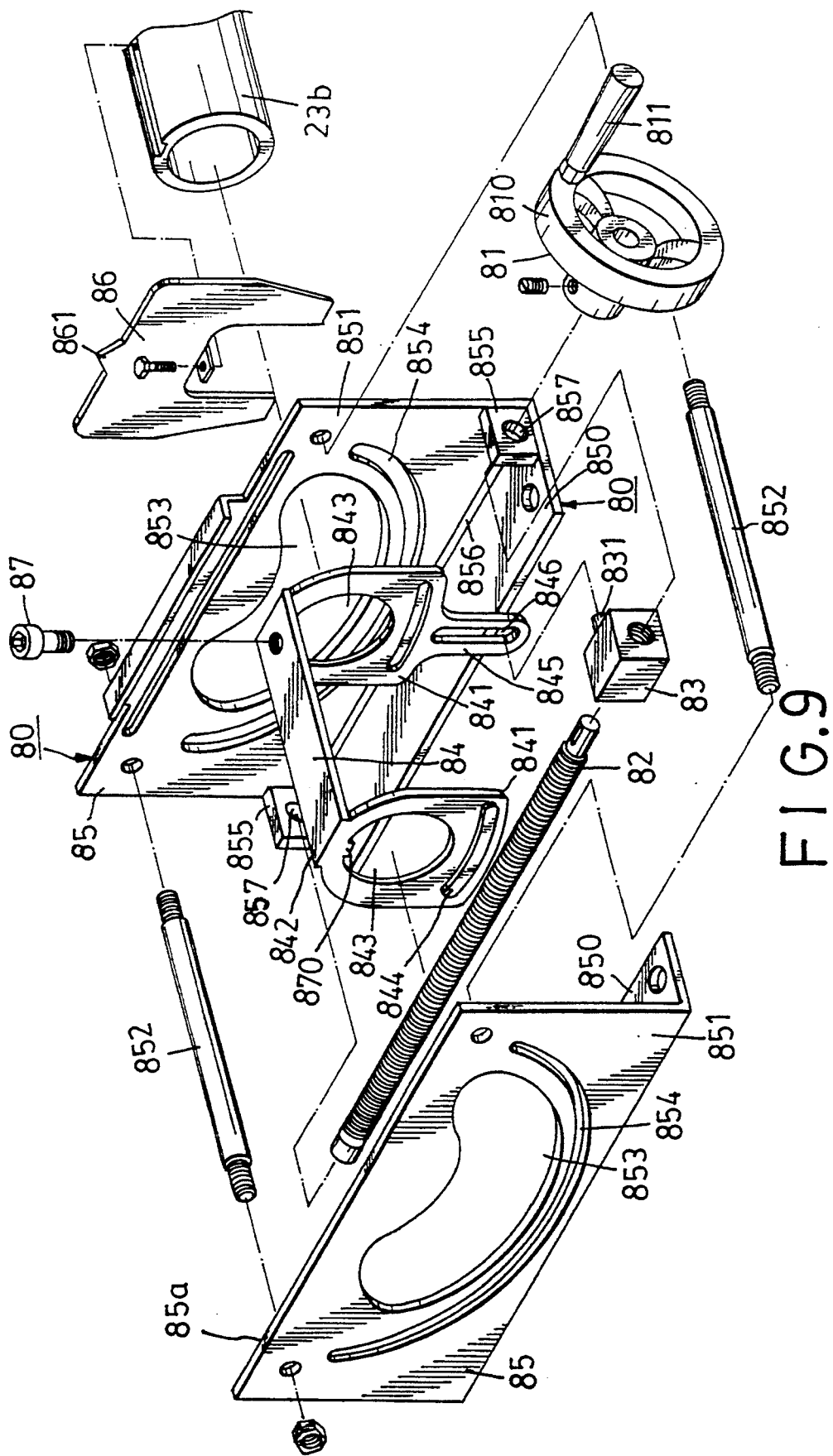
FIG. 9 is an exploded view of a first preferred embodiment of a moving means of this invention which is used for moving a lower hollow arm along an arcuate path in order to adjust an inclined position of the elongated saw blade with respect to a working surface of the worktable.
Figure 10:
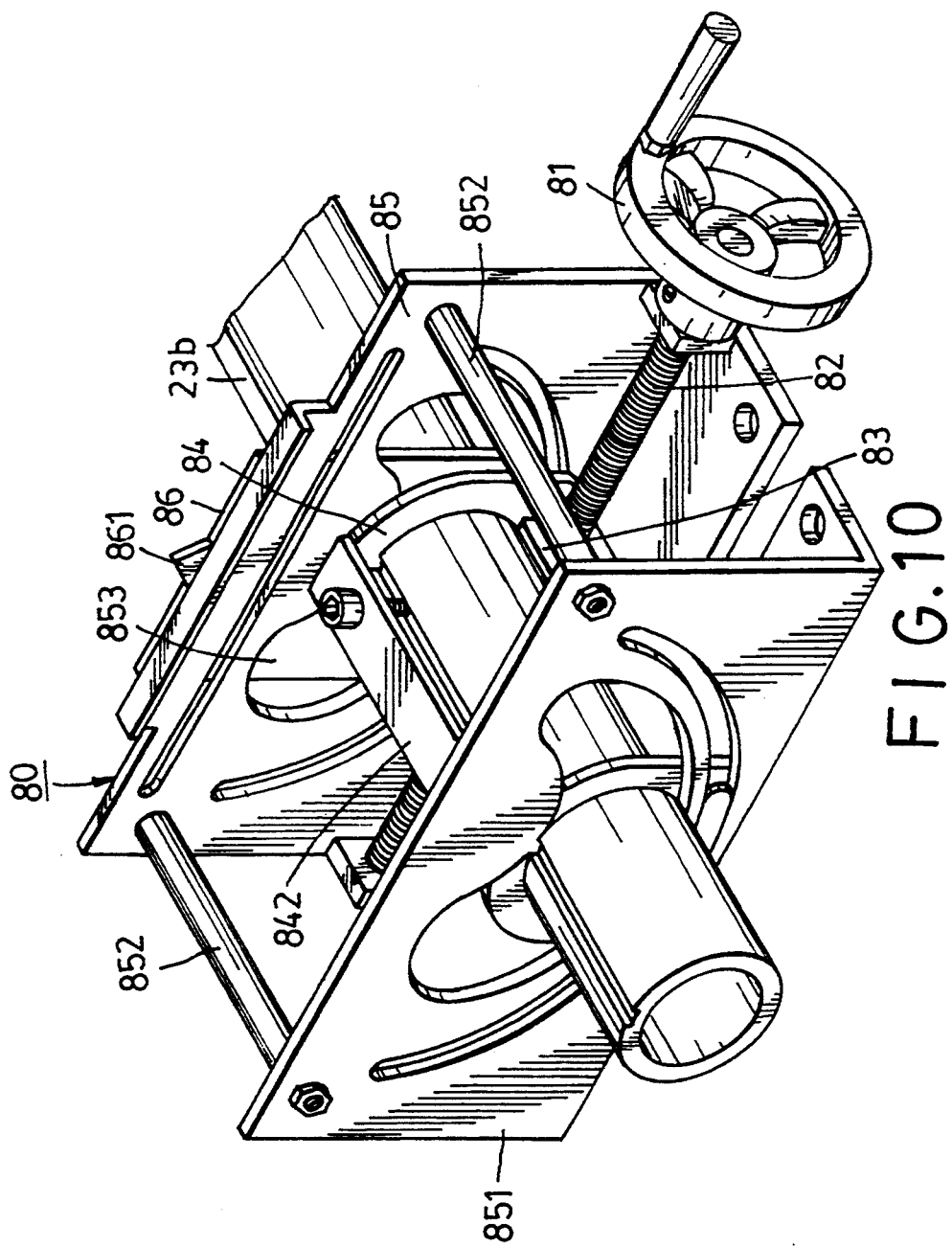
FIG. 10 is an assembled view of the first preferred embodiment of the moving means shown in FIG. 9.

Referring to FIGS. 6, 7 and 8, an upper sawblade mounting member 700 is disposed above the working surface 22 and includes a saw-blade mounting seat 70 and a second slidable member 53 which are to be mounted slidably to the front end of the upper hollow arm (23a). A lower saw-blade mounting member (700a) is disposed below the working surface 22 and includes a saw-blade mounting seat 70 and a second slidable member 53 which are mounted slidably to the front end of the lower hollow arm (23b). The connection between the saw-blade mounting seat 70, the second slidable member 53 and a respective one of the upper and lower hollow arms (23a, 23b) will be described later. The saw-blade mounting seats 70 define cooperatively a straight line (1) which passes through the sawing slot (a). It can be shown that the straight line (1) extends substantially in a vertical direction with respect to the horizontal working surface 22.

The sawing machine (M1) of this invention includes means (CM) for converting the synchronous rotations of the upper and lower shafts (30a, 30b) into synchronously and reciprocatingly linear movements of the saw-blade mounting seats 70 of the upper and lower saw-blade mounting members 700, (700a) along the straight line (1) when the upper and lower shafts (30a, 30b) are driven by the driving mechanism (D) to rotate synchronously. The converting means (CM) has an upper converting mechanism (CM1) for converting the rotation of the upper shaft (30a) into the reciprocating linear movement of the saw-blade mounting seat 70 of the upper saw-blade mounting member 700, and a lower converting mechanism (CM2) for converting the rotation of the lower shaft (30b) into the reciprocating linear movement of the saw-blade mounting seat 70 of the lower saw-blade mounting member (700a). Referring to FIGS. 6 and 7, each of the upper and lower converting mechanisms (CM1, CM2) includes a positioning member 60 which has a retaining plate (63a) that is fixed to the front end of a respective one of the upper and lower hollow arms (23a, 23b) by means of screws. The retaining plate (63a) is formed with an elongated guiding slot 63 which extends in a first direction parallel to the straight line (1). It can be shown that the elongated guiding slot 63 extends vertically. The positioning member 60 further has a plate 62 which extends forwardly from the retaining plate (63a) and a flange 64 which projects rearwardly into the front end of a respective one of the upper and lower hollow arms (23a, 23b). The second slidable member 53 is disposed behind the retaining plate (63a). The second slidable member 53 has a front protrusion 532 which engages slidably the elongated guiding slot 63, and a rear recess 531 which extends in a second direction substantially perpendicular to the straight line (1). It can be shown that the rear recess 531 extends horizontally. The positioning member 60 is provided with two parallel elongated guiding slots 54. Each elongated guiding slot 54 has a top end that is fixed to the flange 64 of the positioning member 60 and a bottom end that passes through the second slidable member 53 via a hole 533 thereof such that the second slidable member 53 can be slidable vertically along the elongated guiding rods 54.

Each of the upper and lower converting mechanisms (CM1, CM2) includes an annular member 40 which is mounted in a respective one of the upper and lower hollow arms (23a, 23b) adjacent to the front end thereof in order to center each of the upper and lower shafts (30a, 30b) in a respective one of the upper and lower hollow arms (23a, 23b), and a bearing 42 which is provided between the annular member 40 and the respective one of the upper and lower shafts (30a, 30b). An eccentric member 50 is disposed in front of the annular member 40. The eccentric member 50 has an annular wheel 51 which is fixed to and rotatable with the front end of a respective one of the upper and lower shafts (30a, 30b) by means of an engaging member (54a) that engages a recess 31 in a respective one of the upper and lower shafts (30a, 30b) and a recess 513 in the annular wheel 51. The eccentric member 50 further has an eccentric pin 511 which projects forwardly from the annular wheel 51. A first slidable member 52 engages slidably the rear recess 531 in the second slidable member 53 of a respective one of the upper and lower saw-blade mounting members 700, (700a). The first slidable member 52 is formed with a hole 52 in which the eccentric pin 511 of the eccentric member 50 engages rotatably.

Each saw-blade mounting seat 70 has a base 71 which is secured to the front protrusion 532 of the second slidable member 53 via the elongated guiding slot 63 and which is slidable with the second slidable member 53. The base 71 of the saw-blade mounting seat 70 has a plate 711 and a pair of lower arms 712. The sawblade mounting seat 70 further has a positioning member 72 which is secured turnably to the lower arms 712.

An elongated saw blade 75 extends along the straight line (1) and passes through the sawing slot (a). The elongated saw blade 75 has two ends. A respective one of the two ends of the elongated saw blade 75 is retained fixedly in a hole 721 of the positioning member 72 by means of two screw members.

Referring also to FIG. 8, a bellows 73 has an upper end which is attached to the plate 62 of the positioning member 60 of the upper converting mechanism (CM1) and a lower end which is attached to the plate 711 of the saw-blade mounting seat 70. The bellows 73 is associated with a tube 74 which extends downwardly from the upper end of the bellows 73 toward the sawing slot (a) of the worktable (22a).

Referring to FIGS. 6 and 7, it can be realized that the elements and structures associated with the upper shaft (30a) and the upper hollow arm (23a) are substantially similar to those associated with the lower shaft (30b) and the lower hollow arm (23b). However, the positioning of the positioning member 60 of the lower converting mechanism (CM2) and the sawblade mounting seat 70 of the lower saw-blade mounting member (700a) are inverted relative to those of the positioning member 60 of the upper converting mechanism (CM1) and the saw-blade mounting seat 70 of the upper saw-blade mounting member 700.

Figure 11A:
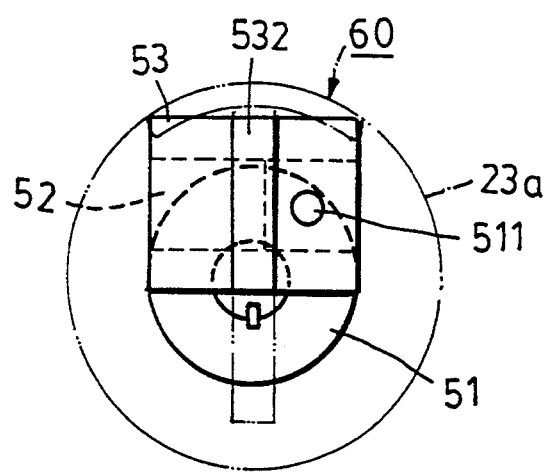
FIGS. 11A and 11B are schematic views showing the movement of the upper converting mechanism relative to the rotation of the upper shaft.
Figure 11B:
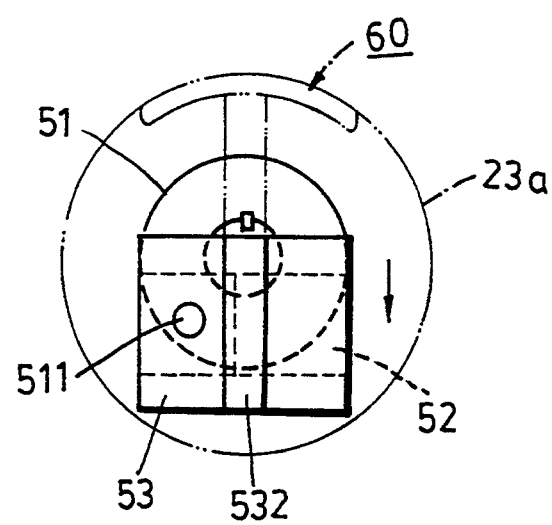

Referring to FIGS. 6, 11A and 11B, when the driving gear 242 is driven to rotate by the motor 241, the upper and lower driven gears 243 are rotated, thereby driving the upper and lower shaft (30a, 30b) to rotate synchronously. Each eccentric wheel 51 is rotated with a respective one of the upper and lower shafts (30a, 30b). The first slidable member 52 of the upper converting mechanism (CM1) and the first slidable member 52 of the lower converting mechanism (CM2) are actuated to reciprocate synchronously and horizontally in the rear recesses 531 of the second slidable members 53, while the second slidable member 53 of the upper saw-blade mounting member 700 and the second slidable member 53 of the lower saw-blade mounting member (700a) are actuated to reciprocate synchronously and vertically in the elongated guiding slots 63 of the positioning members 60 along the elongated guiding rods 54, thereby moving reciprocatingly the saw-blade mounting seats 70 as well as the elongated saw blade 75 along the straight line (1). In this way, the elongated saw blade 75 can be used to cut the workpiece. During operation, owing to the reciprocation of the saw-blade mounting seat 70 of the upper saw-blade mounting member 700, the bellows 73 is expanded and contracted so as to blow out chips from the cut workpiece via the tube 74.

Referring to FIG. 6, since the upper and lower shafts (30a, 30b) are mounted rotatably in the upper and lower hollow arms (23a, 23b), and the converting means (CM) is provided to convert the synchronous rotations of the upper and lower shafts (30a, 30b) into synchronous and reciprocating linear movements of the saw-blade mounting seats 70, the elongated saw blade 75 can be moved reciprocatingly along the straight line (1) without lateral displacement when the upper and lower shafts (30a, 30b) are driven to rotate synchronously. Therefore, the elongated saw blade 75 can cut smoothly the workpiece without deformation or twisting of the former. In addition, since the elongated saw blade 75 reciprocates along the straight line (1) instead of a slightly curved path, there is no pulling action on the workpiece by the elongated saw blade 75 so that the load of the motor 241 as well as the power consumption are lower than those in the prior art.

According to the sawing machine (M1) of this invention, a metal workpiece can be cut when a proper metal elongated sawing blade is used. Furthermore, since the positioning members 72 of the saw-blade mounting seats 70 are secured turnably, the cutting edge of the elongated saw blade 75 can be turned by an angle of up to 90 degrees by turning the positioning members 72.

The sawing machine (M1) of this invention further has means for moving the lower hollow arm (23b) along an arcuate path to move simultaneously the upper hollow arm (23a) in order to adjust an inclined position of the straight line (1), which is defined by the sawblade mounting seats 70 of the upper and lower sawblade mounting members 700, (700a) and which passes through the sawing slot (a) of the worktable (22a), relative to the working surface 22 of the worktable (22a) so as to dispose the elongated saw blade 75 in the inclined position. The moving means generally includes a stationary bracket unit which is fixed to the base body 21 under the working surface 22 and which is formed with an arcuate guiding portion to define the arcuate path, and a holding unit which holds rigidly the lower hollow arm (23b). The holding unit is mounted slidably to the stationary bracket unit and is capable of sliding along the arcuate guiding portion of the stationary bracket unit.

Referring to FIGS. 9, 10, 12A and 12B, a first preferred embodiment of the moving means 80 includes a stationary bracket unit (85a) that has two opposed L-shaped brackets 85. Each L-shaped bracket 85 is fixed to the base body 21 under the working surface 22, and has a vertical portion 851 and a horizontal portion 850. The vertical portions 851 of the L-shaped brackets 85 are connected to each other by means of two connecting rods 852. Each vertical portion 851 is formed with a lower arcuate guiding slot 854 to define the arcuate guiding portion of the moving means and an upper arcuate opening 853. A holding unit 84 is located between and mounted slidably to the L-shaped brackets 85. The holding unit 84 has two spaced vertical plates 841 and a horizontal connecting plate 842. Each vertical plate 841 has a substantially circular opening 843 and a lower arcuate engaging member 844 that projects outwards to engage slidably the lower arcuate guiding slot 854 in the vertical portion 851. One of the vertical plates 841 further has a projecting part 845 that extends downwardly therefrom to pass slidably through an elongated slot 856 in one of the L-shaped brackets 85. The projecting part 845 is formed with a vertically extending slot 846. An adjustment threaded rod 82 has two ends which engage rotatably two holes 857 in a pair of mounting members 855 of ! said one of the L-shaped brackets 85. A nut member 83 is sleeved around and engages movably the adjustment threaded rod 82. The nut member 83 has a protrusion 831 which engages slidably the vertically extending slot 846 of the projecting part 845 of the holding unit 84. The lower hollow arm (23b) passes through the arcuate openings 853 in the L-shaped brackets 85 and the substantially circular openings 843 in the holding unit 84, and is secured to the movable unit 84 by means of a screw 87 and engaging protrusions 870. A rotary handle 81 is mounted to the base body 21 and has a wheel 810 portion to which one of the ends of the adjustment threaded rod 82 is fixed, and a handle portion 811. Referring again to FIGS. 5, 6 and 9, the moving means 80 includes a substantially U-shaped plate 86 which is secured to the lower hollow arm (23b), and is provided with a top pointer 861 which projects upwardly to point to a graduation portion (g) that is formed on the working surface 22.

When the adjustment threaded rod 82 is rotated by operating the handle portion 811 of the rotary handle 81, the nut member 83 moves along the adjustment threaded rod 82, thereby driving the holding unit 84 to slide along the arcuate guiding slots 854 so as to move the lower hollow arm (23b). At the same time, the upper hollow arm (23a) is also moved with the lower hollow arm (23b). In this way, the inclined position of the straight line (1) relative to the working surface 22 can be adjusted, thereby adjusting the inclined position of the elongated saw blade 75.

Figure 12A:
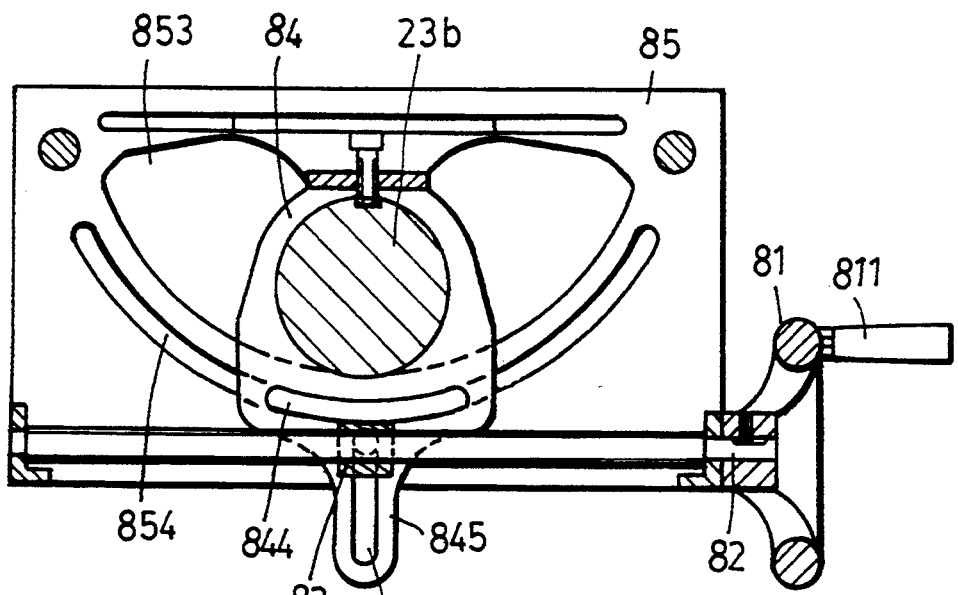
FIGS. 12A and 12B are schematic views showing the operation of the moving means of the first preferred embodiment.
Figure 12B:
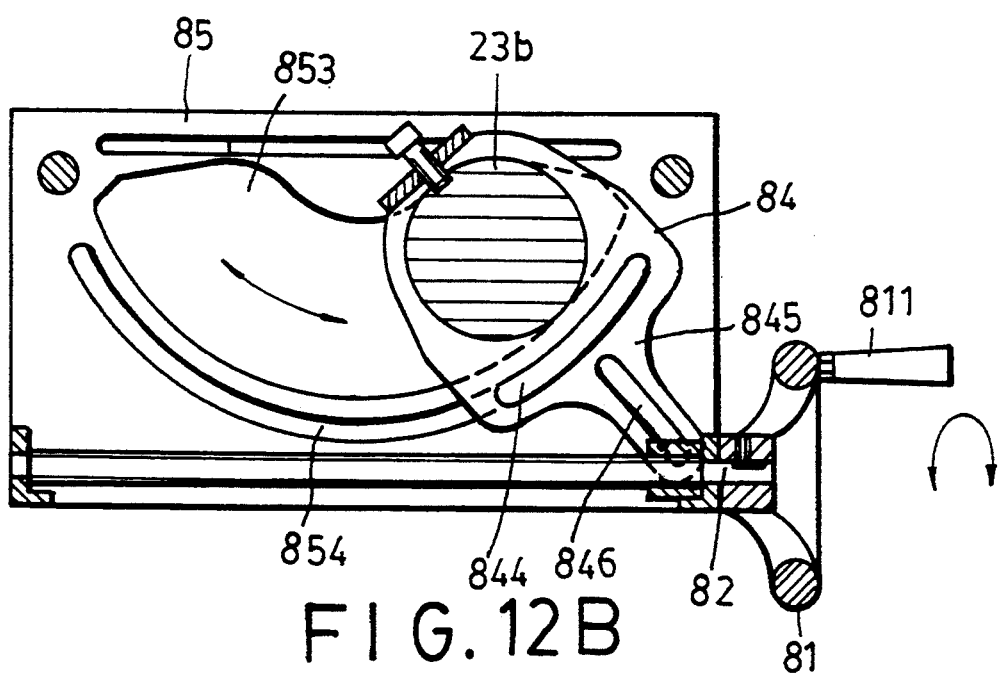

Referring again to FIGS. 6 and 12A, the nut member 83 is generally moved to a middle portion of the adjustment threaded rod 82 by operating the rotary handle 81 in order to dispose the straight line (1) defined by the saw-blade mounting seats 70 in the vertical direction relative to the horizontal working surface 22 so as to dispose the elongated saw blade 75 in the vertical direction. Referring to FIG. 12B, the nut member 83 is moved along the adjustment threaded rod 82 toward the rotary handle 81 to move the holding unit 84 as well as the lower hollow arm (23b) along the lower arcuate guiding slots 854 in order to dispose the straight line (1) in an inclined position relative to the working surface 22 so as to place the elongated saw blade 75 in the inclined position. In this way, when the elongated saw blade 75 is actuated to cut the workpiece, a bevel can be formed on the workpiece.

With the provision of the moving means 80 to adjust the inclined position of the elongated saw blade 75, the worktable (22a) of this invention does not need to be moved and inclined in order to adjust the inclined position of the working surface 22. Thus, the workpiece can be supported stably on the working surface 22 without the risk of downward sliding.

Figure 13:
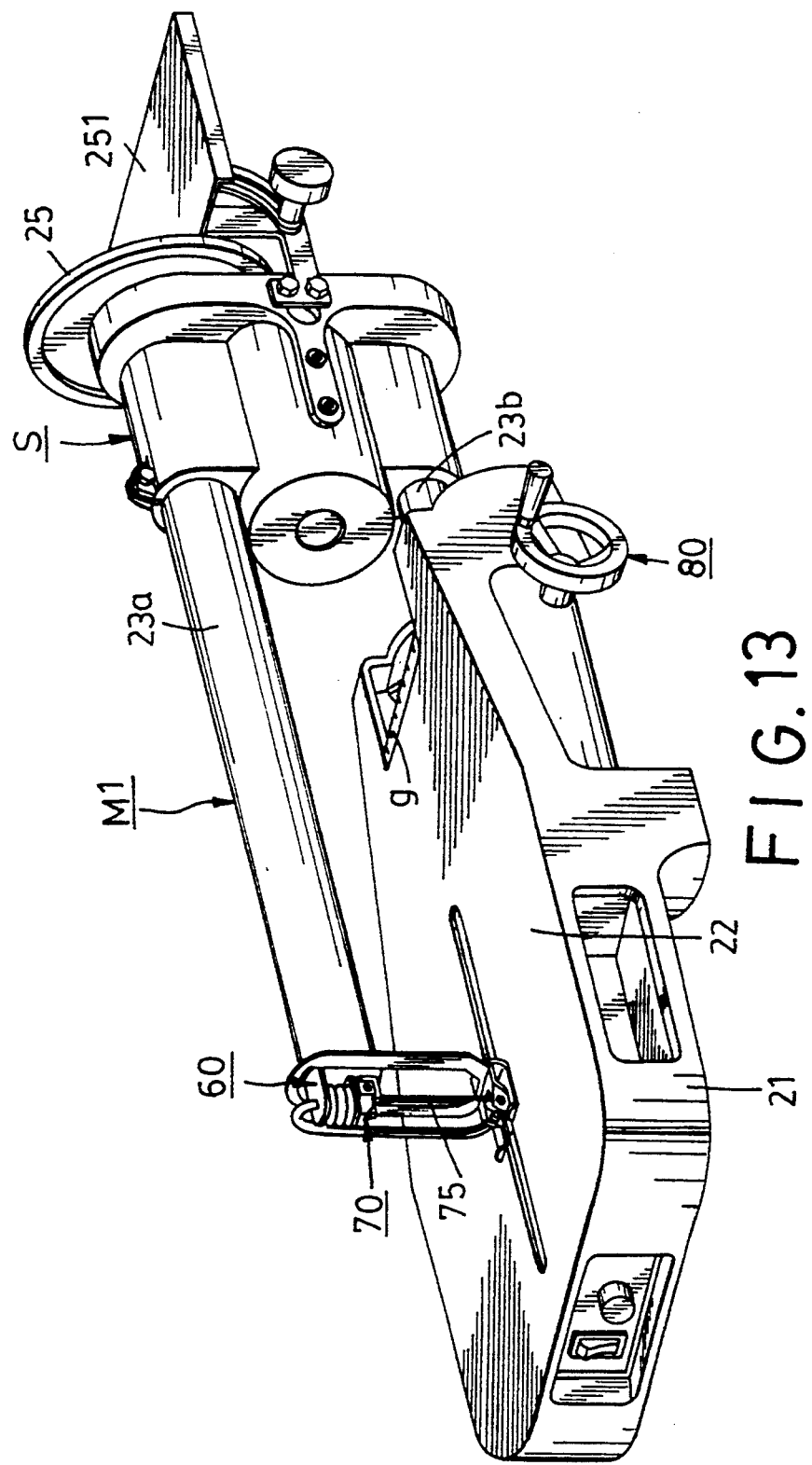
FIG. 13 is a perspective view of the sawing machine shown in FIG. 5 showing the elongated saw blade when moved rearwards.
Figure 14:
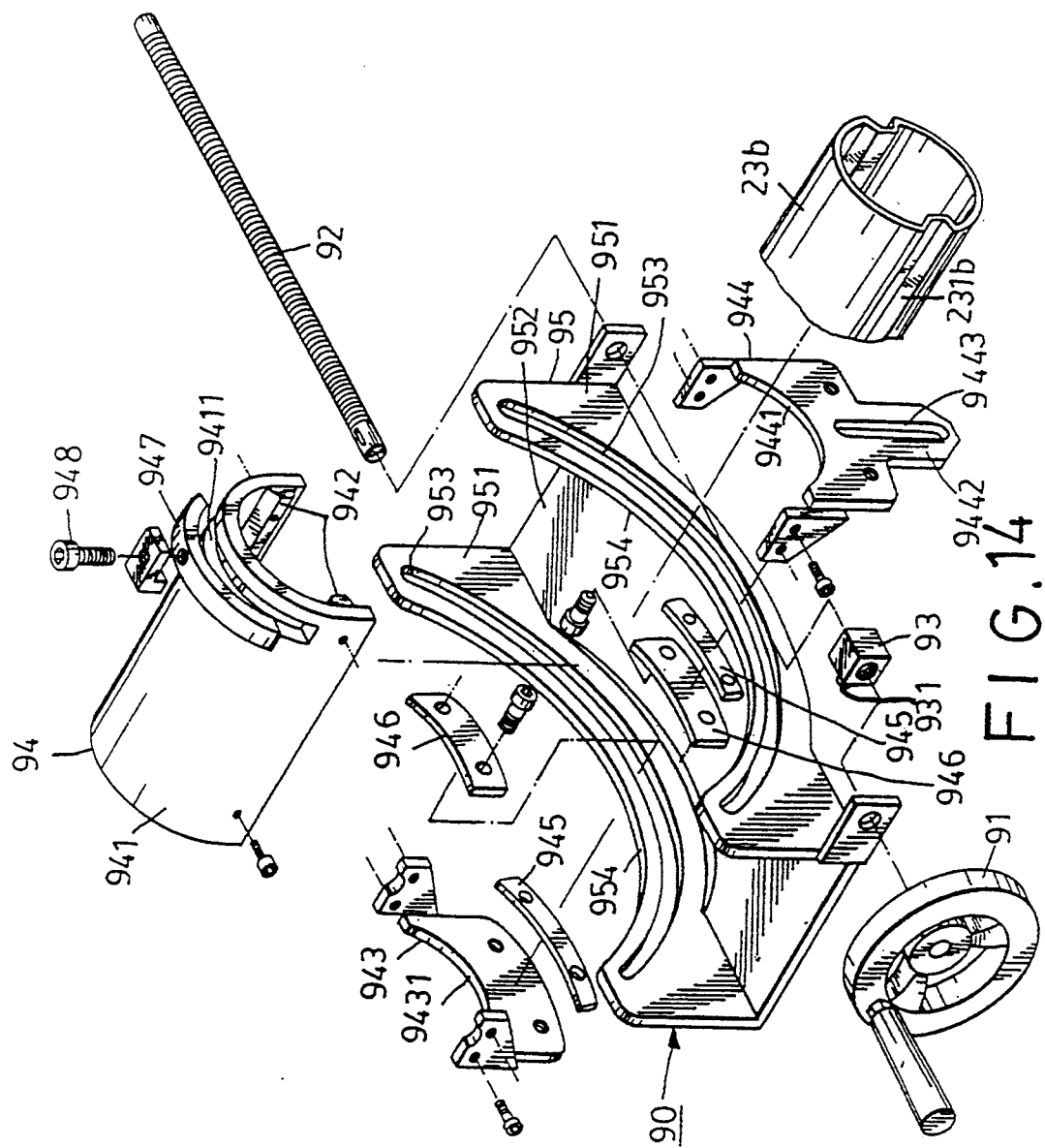
FIG. 14 is an exploded view of a second preferred embodiment of the moving means.
Figure 15:
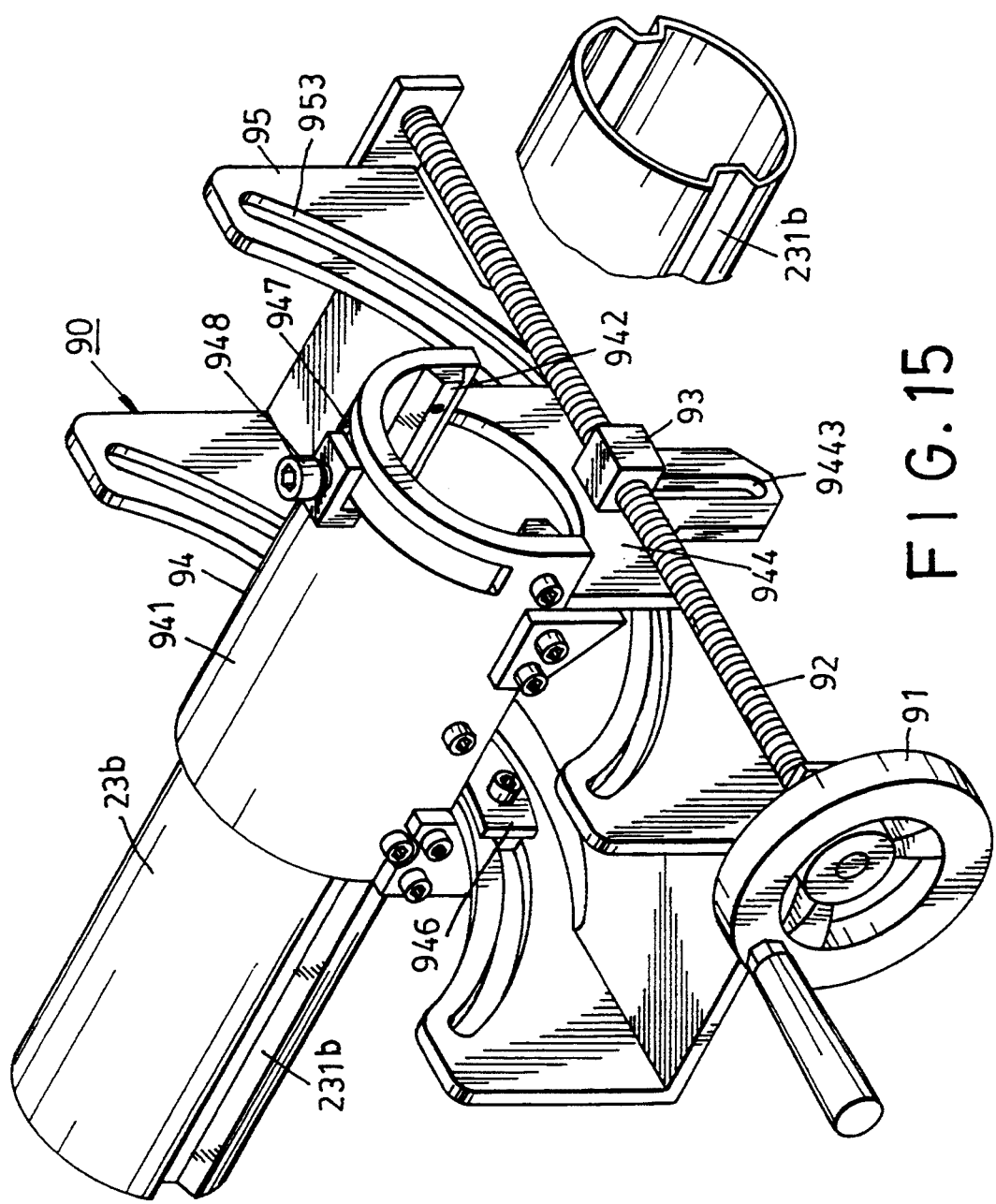
FIG. 15 is an assembled view of the second preferred embodiment of the moving means shown in FIG. 14.

Referring to FIG. 13, the support body (S) and the upper and lower hollow arms (23a, 23b) can be moved rearward in order to enlarge the space between the elongated saw blade 75 and the front portion of the base body 21 so as to facilitate the cutting operation for a workpiece with a larger length. Referring to FIGS. 6 and 13, the sawing machine (M1) can be further provided with a grinding wheel 25 and a worktable 251.

FIGS. 14 to 17 show a second preferred embodiment of the moving means 90. The moving means 90 includes a stationary bracket unit 95 which is fixed to the base body 21 and which has two opposed vertical portions 951 and a horizontal portion 952 connected to the vertical portions 951. Each of the vertical portions 951 is formed with a lower arcuate guiding slot 953 and an upper concave recess 954. A holding unit 94 has an upper cover 941 which is located above the vertical portions 951 of the stationary bracket unit 95. The cover 941 has a top opening 9411 and two opposed elongated retaining bars 942 which are formed on an inner wall of the cover 941. The holding unit 94 further has a front support plate 943 and a rear support plate 944 which are located respectively beside the vertical portions 951 of the stationary bracket unit 95 and which are fixed respectively to the cover 941. The front support plate 943 has a top support recess 9431, while the rear support plate 944 has a top support recess 9441. The front support plate 943 has an arcuate engaging member 945, which is secured to the front support plate 943 and which engages slidably the lower arcuate guiding slot 953 in the vertical portion 951 by means of a locking piece 946. The rear support plate 944 also has an arcuate engaging member 945, which is secured to the front support plate 944 and which engages slidably the lower arcuate guiding slot 953 by means of a locking piece 946. The rear support plate 944 further has a projecting part 9442 that extends downwardly and that is formed with a vertically extending slot 9443.

An adjustment threaded rod 92 is attached rotatably to a rear one of the vertical portions 951. A nut member 93 is sleeved around and engages movably the adjustment threaded rod 92. The nut member 93 has a protrusion 931 which engages slidably the vertically extending slot 9443 of the projecting part 9442 of the rear support plate 944. The lower hollow arm (23b) is formed with two opposed grooves (231b) in which the opposed elongated retaining bars 942 of the holding unit 94 are engaged fixedly, while the lower hollow arm (23b) passes through the holding unit 94. The holding unit 94 further has a positioning piece 947 which presses against the lower hollow arm (23b) via the top opening 9411 by means of a screw 948 and a washer member in order to position the lower hollow arm (23b) in the holding unit 94. A rotary handle 91 is mounted to the base body 21, while an end of the threaded rod 92 is secured to the rotary handle 91.

When the adjustment threaded rod 92 is rotated by operating the rotary handle 91, the nut member 93 moves to drive the holding unit 94 as well as the lower hollow arm (23b) to move along the arcuate guiding slots 953. The upper hollow arm (23a) is also moved simultaneously with the upper hollow arm (23a), thereby adjusting the inclined position of the straight line (1) as well as the elongated saw blade 75.

Referring again to FIGS. 16 and 17 and also to FIG. 6, a graduated panel 96 is mounted on a front end of the intermediate portion (H3) of the housing (H). A stationary needle pointer 961 is provided with a weight 962 and is attached to a front end of the driving shaft 2411 of the driving mechanism (D). In this way, when the lower hollow arm (23b) is moved, the graduated panel 96 is movable with the housing (H) so that the inclining graduation can be pointed to by the needle pointer 961.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A sawing machine comprising:

a base body having a rear portion, a front portion and a worktable with a top working surface which extends horizontally from said front portion toward said rear portion, said worktable having a sawing slot which is formed therethrough near said front portion and which opens at said working surface;

a support body located adjacent to said rear portion of said base body;

an upper hollow arm having a rear end that is fixed rigidly to said support body and a front end that extends toward said front portion of said base body above said working surface of said worktable;

a lower hollow arm being mounted to said base body below said working surface and located opposite to said upper hollow arm, said lower hollow arm having a rear end that is fixed rigidly to said support body and a front end that extends toward said front portion of said base body;

an upper shaft mounted rotatably in said upper hollow arm and having a rear end and a front end;

a lower shaft mounted rotatably in said lower hollow arm and having a rear end and a front end;

a driving mechanism mounted to said support body and connected to said rear end of each of said upper and lower shafts in order to drive said upper and lower shafts to rotate synchronously;

an upper saw-blade mounting member disposed above said working surface of said worktable and mounted slidably to said front end of said upper hollow arm;

a lower saw-blade mounting member disposed below said working surface and mounted slidably to said front end of said lower hollow arm, said upper and lower sawblade mounting members defining cooperatively a straight line which passes through said sawing slot of said worktable;

means for converting the synchronous rotations of said upper and lower shafts into synchronous and reciprocating linear movements of said upper and lower saw-blade mounting members along said straight line when said upper and lower shafts are driven to rotate synchronously, said converting means having an upper converting mechanism for converting the rotation of said upper shaft into the reciprocating linear movement of said upper sawblade mounting member and a lower converting mechanism for converting the rotation of said lower shaft into the reciprocatingly linear movement of said lower saw-blade mounting member; and an elongated saw blade extending along said straight line and passing through said sawing slot of said worktable, said elongated saw blade having two ends connected respectively to said upper and lower saw-blade mounting members, said elongated saw blade moving reciprocatingly along said straight line when said upper and lower shafts are driven to rotate synchronously so as to move reciprocatingly and synchronously said upper and lower saw-blade mounting members along said straight line.

2. A sawing machine as claimed in claim 1, wherein each of said upper and lower converting mechanisms includes an eccentric member which is fixed to and rotatable with said front end of a respective one of said upper and lower shafts, and a first slidable member which is pivoted to said eccentric member and which engages slidably a respective one of said upper and lower sawblade mounting members.

3. A sawing machine as claimed in claim 2, wherein each of said upper and lower converting mechanisms includes a positioning member which has a retaining plate that is fixed to said front end of a respective one of said upper and lower hollow arms, said retaining plate being formed with an elongated guiding slot which extends in a first direction parallel to said straight line, each of said upper and lower saw-blade mounting members including a second slidable member which has a front protrusion that engages slidably said elongated guiding slot and a rear recess that extends in a second direction perpendicular to said straight line, said first slidable member being engaged slidably within said rear recess and having a hole, said eccentric member having an annular wheel which is fixed to said front end of said respective one of said upper and lower shafts and an eccentric pin which projects from said annular wheel to engage rotatably said hole in said first slidable member, each of said upper and lower saw-blade mounting members further including a saw-blade mounting seat which is secured to said front protrusion of said second slidable member of a respective one of said upper and lower saw-blade mounting members via said elongated guiding slot in said retaining plate, each of said two ends of said elongated saw blade being attached to said sawblade mounting seat of a respective one of said upper and lower saw-blade mounting members, when said upper and lower shafts are driven to rotate synchronously, said second slidable member of said upper saw-blade mounting member and said second slidable member of said lower saw-blade mounting member being actuated to reciprocate synchronously in said first direction while said first slidable member of said upper converting mechanism and said first slidable member of said lower converting mechanism being actuated to reciprocate synchronously in said second direction so as to move reciprocatingly said elongated saw blade along said straight line.

4. A sawing machine as claimed in claim 3, wherein said positioning member of said upper converting mechanism has a plate that projects from said retaining plate thereof, said sawing machine further having a bellows which has an upper end attached to said plate and a lower end attached to said saw-blade mounting seat, said bellows being associated with a tube which extends downwardly from said upper end of said bellows toward said sawing slot of said worktable.

5. A sawing machine as claimed in claim 1, further comprising means for moving said lower hollow arm along an arcuate path and for moving simultaneously said upper hollow arm in order to adjust an inclined position of said straight line, which is defined by said upper and lower saw-blade mounting members and which passes through said sawing slot, relative to said working surface of said worktable so as to dispose said elongated saw blade in said inclining position.

6. A sawing machine as claimed in claim 5, wherein said moving means includes a stationary bracket unit which is fixed to said base body under said working surface of said worktable and which is formed with an arcuate guiding portion to define said arcuate path, a holding unit which holds rigidly said lower hollow arm, said holding unit being engaged slidably by said guiding portion and being slidable along said arcuate path.

7. A sawing machine as claimed in claim 6, wherein said holding unit has an elongated slot, said moving means further including an adjustment threaded rod which is mounted rotatably to said stationary bracket unit, and a nut member which is sleeved around and which engages movably said adjustment threaded rod, said nut member having a protrusion which is engaged slidably within said elongated slot in said holding unit, when said adjustment threaded rod is actuated to rotate, said holding unit and said lower hollow arm being driven to slide along said arcuate guiding portion.

8. A sawing machine as claimed in claim 7, wherein said moving means further includes a rotary handle which is mounted to said base body and connected to one end of said adjustment threaded rod.

* * * * *